MICROWAVE STRIP-IN-TROUGH LINE

Filed Sept. 30, 1966 2 Sheets-Sheet 1

INVENTORS

ALBERT KÜRZL
HANS-ADOLF FRITSCHE

BY Hill & Hill
ATTORNEYS

MICROWAVE STRIP-IN-TROUGH LINE

INVENTORS
ALBERT KÜRZL
HANS-ADOLF FRITSCHE

BY Hill & Hill
ATTORNEYS

United States Patent Office 3,496,492
Patented Feb. 17, 1970

3,496,492

MICROWAVE STRIP-IN-TROUGH LINE

Albert Kürzl, Munich-Lochhausen, and Hans-Adolf Fritsche, Munich, Germany, assignors to Siemens Aktiengesellschaft, a corporation of Germany Filed Sept. 30, 1966, Ser. No. 583,383
Claims priority, application Germany, Sept. 30, 1965, 1,466,388
Int. Cl. H01p 5/14
U.S. Cl. 333—10 9 Claims

ABSTRACT OF THE DISCLOSURE

A microwave component comprising at least one section of strip-like construction wherein a block of conducting material is formed with a channel into which is mounted a strip line comprising insulating material with a strip of conducting material attached to it on one side in the form of a printed circuit, for example, and in which the printed circuit structure is mounted into the bottom of the channel formed in the block of conducting material with the insulating portion against the bottom of the channel. The sides of the channel are formed sufficiently deep such that radiation at the desired operating frequency is negligible. Means for coupling the strip line to coaxial line and means for providing a directional coupler are disclosed. Also means for attenuating energy passing through the line are shown. Clip structures for connecting a pair of printed circuit lines according to the invention are also disclosed.

The invention relates to a microwave component with at least one line section of strip-like construction.

The printed circuit techniques are also being used more and more for line components in very high frequency devices. Lines of this type have become known by the term "microstrip" and consist of a conductive layer of relatively great width applied to a plate of insulating material, which conductive layer forms a conductor, and a narrow conductor strip disposed on the other side of the insulating plate which forms the other conductor of a band line. This type of line construction also is generally designated as strip line technique. The properties of these lines are largely determined by the dimensions of the insulating interlayer and the size of the conductor strip involved. The great disadvantage of such lines resides in the fact that through the open arrangement there may take place a considerable waste radiation of high frequency energy and, furthermore, an influencing by external elements can take place very easily.

The invention has as its underlying problem the avoidance of these disadvantages in such lines and especially in components with strip line construction of the type mentioned.

This problem is solved according to the invention by a construction in which a plate of insulating material is provided on one side with a strip-like conductor in the manner of a printed circuit, and such insulating plate is arranged with its conductor-free side disposed on the base portion of a shielding casing or housing, with the strip-like conductor, together with the base portion and the side walls of the shielding casing, forming the line system.

In an especially preferred form of construction a shallow box-like shielding casing is provided with narrow elongated chambers formed by conductive sub-dividing walls, in which chambers is disposed the insulating plate provided with the strip-like conductor.

For the construction of such line as a directional coupler a construction is expedient in which on the side of the insulating plate remote from the base portion there are provided two strip-like conductors, each of which together with the base portion and the side walls of the shielding casing forms a line circuit, with the two conductors being disposed close together over a zone corresponding to the required coupling factor, and in which the shielding walls are interrupted, and there is provided thereat rounded protuberances, whereby the predominantly inductive coupling thereat is compensated.

For the construction of the element as an absorber, an arrangement is advantageous in which there is inserted below the conductor strip into the insulating plate an attenuation wedge which preferably has a tapering configuration for a reflection-free transition. Expediently, on the side of the strip-like conductor remote from the insulating plate there is disposed a further attenuation wedge, which is covered, preferably at least on the remote end of the wedge, by a metal angle which is in good conductive connection with the base portion.

Transitions from the individual strip lines to coaxial line connections are constructed in such a way that the outer conductor is conductively connected to the wall of the shielding casing at the level of the strip conductor and the inner conductor of the individual coaxial line connection is directly connected with the appropriate strip conductor.

Expediently, in the transitional range from the strip conductor to the inner conductor of the individual coaxial line connection, means are provided for the compensation of reflections, especially in the form of a restriction of the outer conductor.

For the connection of two strip conductors adjacent one another, in a further advantageous development of the invention, there is utilized a T-shaped spring element constructed of resilient strip material, whose vertical shank is insertable into the separating gap between the line sections and between the insulating plates, and is provided at its inner end with barbs which extend behind and grip the insulating plate, and whose horizontal cross piece bears resiliently on the strip conductor ends. In the base portions of the line shield casing there is disposed at the location of the spring element a recess sufficiently large for such barbs, preferably of such a size that any line disturbance resulting from the spring element is simultaneously compensated.

In the following the invention is explained in detail with the aid of examples of construction illustrated in the drawings, wherein like reference characters indicate like or corresponding parts, and in which.

Figure 2:
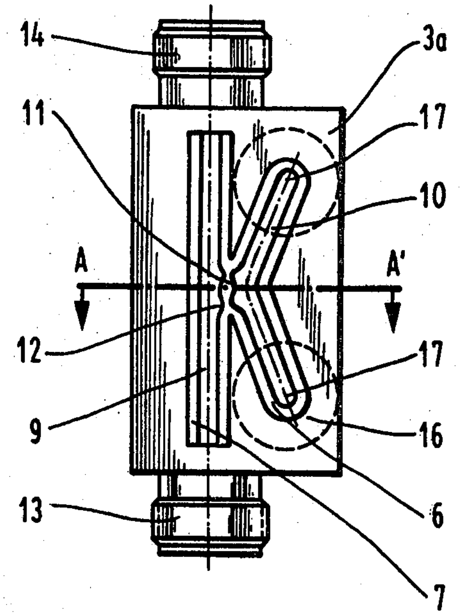
FIG. 2 is a side elevational view of a directional coupler embodying the invention.
Figure 2A:
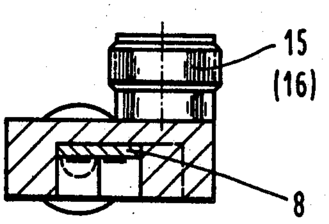
Figure 3:
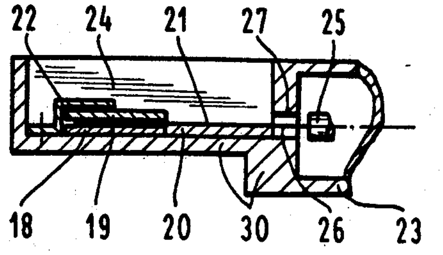
Figure 3A:
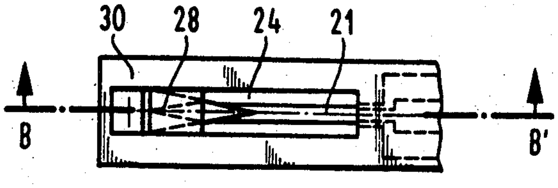
Figure 3B:
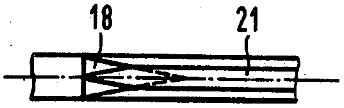
Figure 4:
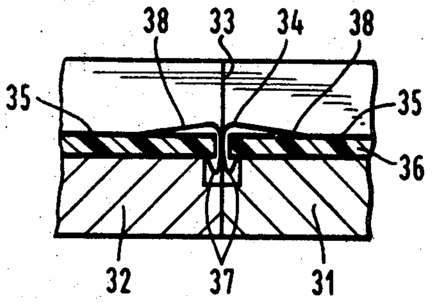
Figure 5:
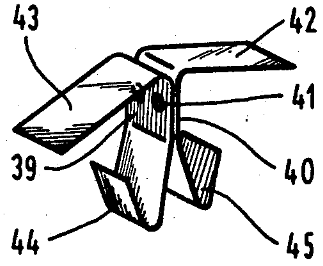
Figure 6:
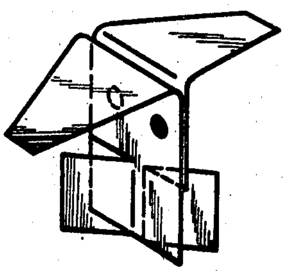
Figure 7:
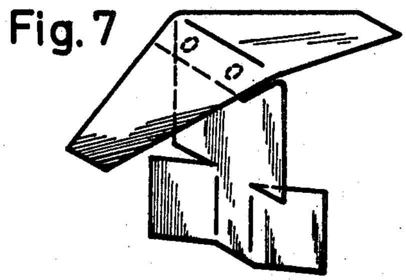

FIG. 2*a* is a sectional view taken approximately on the line A–A′ of FIG. 2;

FIG. 3 is a sectional view taken approximately on the line B–B′ of 3*a* of absorber for microwave;

FIG. 3*a* is a plan view of the absorber illustrated in FIG. 3;

FIG. 3b illustrates the strip conductor of FIGS. 3 and 3a without the angle 22;

FIG. 4 is a longitudinal sectional view through the abutting ends of two line conductors and cooperable shield casings;

FIG. 5 is a perspective view of the contact spring element illustrated in FIG. 4; and FIGS. 6 and 7 are perspective views similar to FIG. 5, illustrating further embodiments of contact spring elements.

Figure 1:
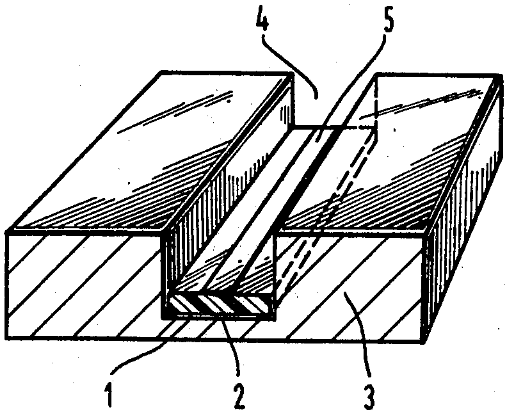
FIG. 1 is a perspective view of a portion of a line section constructed in accordance with the invention.

Referring to FIG. 1, a plate 1 of insulating material is disposed with its conductor-free side 2 on the base portion of a shield casing 3. Such shield casing may comprise a metal block provided with a groove therein resulting in a narrow elongated chamber 4 which receives the insulating plate 1 and the strip-like conductor 5 therein. The side walls of the shield casing extend relatively high above the strip conductor 5 proper, in order to avoid the occurrence of a radiation of high frequency energy. The necessary height of such side walls can be very simply determined experimentally by the method that if adequate, a shielding cover placed on the shielding casing 3 will exert no reactance effect on the line. In one example of construction there resulted, for a wave resistance of a strip line of 50 ohms, a thickness of the insulating material, consisting of Teflon of 1.5 mm., a width of the chamber 7 mm., a width of the strip conductor of 2.8 to 2.9 mm. and a height of the chamber walls of about 10 mm. From a chamber height of 7 to 10 mm. the influence of a cover placed on the shielding casing of the line is negligibly small. The line 5 is so dimensioned that for up to about 10 gHz. the occurrence of higher modes is practically impossible. It forms a type of coaxial line with longitudinally slotted outer conductor. A cover therefor (not shown in the drawing) is necessary only when it is desired to protect the line with respect to mechanical damage and other influences.

Such strip line extending in a chamber combines the advantages of the shielded coaxial line with those of the printed circuit technique and avoids the waste radiation of high frequency energy occurring in the usual microstrip system. Moreover, the line becomes much more stable mechanically through the shielding case 3 than with a ground conductor comprising a thin layer or thin metal plate.

Furthermore, several strip lines or elements, constructed in this manner, can be placed closely adjacent to one another without a reciprocal influencing of the individual lines, so that ultimately a shield casing may be produced which is sub-divided by conductive walls into narrow elongated chambers in which the strip conductors are located.

An especially simple construction according to this technique is illustrated in FIG. 2 and represents a directional coupler. In a metal block 3a there are provided two longitudinally extending chambers 6 and 7, with the chamber 6 extending angularly from its center with the effective length parallel to chamber 7 in the bend area determining the proporties of the directional coupler. In both chambers there are disposed strip lines in accordance with the technique described in connection with the disclosure of FIG. 1. The common shielding wall is removed over a short interval in the central zone, so that the two strip lines 9 and 10 can be coupled with each other thereat. Expediently this insulating plate, as can be seen particularly from FIG. 2a may consist of a single piece and is merely mounted in the groove-shaped chambers with the strip conductors 9 and 10 previously applied thereto and secured, for example, by cementing. The strip-like conductors 9 and 10 are provided in the coupling space, indicated by the numeral 11, with rounded protuberances 12.

The portions of the conductors in the coupling zone are provided with the rounded bulges in such a way that the predominantly inductive coupling thereat is compensated. The rectilinearly extending line 9 terminates at both ends in coaxial line connections 13 and 14, whose outer conductors are conductively connected with the wall of the shield casing 3a and whose inner conductors extend in the direction of the strip-shaped conductor 9 and are connected therewith. The angularly extending line 10 terminates at both ends in respective coaxial line connections 15 and 16 arranged perpendicularly thereto. In FIG. 2a only one of such two connections is visible. The inner conductor of the line connections 15 and 16, expediently constructed as plug and socket type screw-on terminals vertically abutting the ends of the conductor strip and are suitably connected therewith at the points 17, for example, by soldering. The connection between the line element and the coaxial line inner conductor is preferably dimensioned as hereafter explained in greater detail.

FIGS. 3 and 3a illustrate an example of utilization of principles according to the invention in an absorber for microwaves. FIG. 3a illustrates an arrangement of two attenuation wedges 18 and 19 disposed in the line path. These two small plates of attenuation material of wedge-shape configuration are disposed at both sides of the strip conductor. The lower attenuation wedge there replaces the end of the insulating material interlayer 20 for the strip line 21. For the compression of the two attenuation wedges 18 and 19 there is provided at the end of the assembly an angle 22, which is connected with the base portion of the shield casing and the elements 18 and 19, with interposition of the strip line 21, and are clamped to the base portion of the shield casing. The strip-like conductor 21 is constructed with a wedge-like configuration in the zone of the attenuation wedges 18 and 19 up to the end of the attenuation wedges. This is indicated in the figure by the broken line designated by the reference numeral 28. The wedge formation can also be carried out in the form of a suitable tapering. The angle 22 consists, expediently, of metal and is offset at least sufficiently that it does not touch the tip of the adjacent strip conductor.

FIGS. 3 and 3a also illustrate an example of construction of a low reflection transition of the strip-like conductor to a coaxial line for the microwave range. The outer conductor 23 of the coaxial line is connected directly with the elongated chamber of the shielding casing 30 or is constructed as a part of such casing, the groove therein for the accommodation of the strip conductor being designated as 24. The inner conductor 25 of the coaxial line is designed in the transition zone as a metal strip 26, so that together with the restriction 27 of the outer conductor in the transition zone from the strip-like conductor 21 to the inner conductor 25 of the coaxial line there is assured a wide band matching. The strip conductor arrangement, omitting the sheet metal angle 22 and the attenuation wedge 19, is illustrated in FIG. 3b.

In a further advantageous development of the invention, for the connection of two line sections of the type described there is proposed the arrangement illustrated in FIGS. 4 and 5, in which FIG. 4 illustrates the transition between two line sections according to FIG. 1. The two sections 31 and 32 are butted against one another at the point 33, and connection of the ground conductors (shield casings) can be achieved in any of the known manners, for example, by means of a U-shaped member (not shown in the figure) which surrounds the ground members and is connected with both ends of the sections 31 and 32 by suitable means, such as screws. For the connection of the two strip conductors, in an expedient further development of the invention, there is proposed a contact spring element which is illustrated in FIG. 4, in which the contact spring element 34, constructed of resilient strip material, is inserted into the separating gap existing between the ends of the strip conductor 35 until the shank ends of such contact spring element, which are bent to form barbs or prongs, snap behind the lower edges of the insulating plate 36. In order to provide sufficient space for such barbs, there is provided a hollow space 37 in both parts 31 and 32 at their abutting ends, which preferably is semi-circular in each of the parts, so that there results a hollow space with circular base surface in which the barbs are disposed. It is advantageous to so dimension such hollow space that the disturbances which may arise from the inclusion of the contact spring element in the line, as a result of its capacitative component, are simultaneously compensated. The contact spring element is bent in such a way that the ends 38 of the contact bridge are pressed against the strip line 35 with good contacting effect by spring pressure.

An advantageous construction of such a contact spring is illustrated in FIG. 5. The contact spring element, as viewed in cross section, has a generally T-shaped configuration, and comprises two L-shaped members 39 and 40, which are suitably connected with one another at the point 41, for example, by spot welding. The cross bar of the T consists of the wing portions 42 and 43 having, for example, a width corresponding to that of the line. Both portions are of resilient material, for example, copper beryllium, which is covered with a layer of silver. The ends of the two shanks 44 and 45 are bent back to form respective barbs or prongs for the purpose heretofore mentioned.

Further favorable forms of construction for such contact spring element are illustrated in FIGS. 6 and 7. In FIG. 6, the bars or prongs are bent outwardly from the shank structure along vertical lines, each barb being formed from one of the resilient portions. In FIG. 7, the wing portions are constructed from one piece of material, with the shank portion being constructed from another. In this construction both barbs are of a construction similar to that illustrated in FIG. 6, but in this case are formed from the same piece of material. Through use of these elements it is possible in an advantageously simple manner to connect such line pieces with one another for easy separation at any time. However, by means of the compensation described there can be achieved a high degree of freedom from reflection over a very broad range of frequencies.

Changes may be made within the scope and spirit of the appended claims which define what is believed to be new and desired to have protected by Letters Patent.

We claim:

1. A microwave structure consisting of at least one double-line section in which one conductor is constructed in the form of a strip mounted on a strip of insulating material constructed as a printed circuit, the other conductor having a U-shaped channel and the strip-like conductor and strip of insulating material mounted in said channel, with the strip of insulating material arranged with its conductor-free side disposed against the bottom of the channel of said other conductor, the width of the strip-like conductor being about 0.4 of the distance between the parallel side walls of the U-shaped channel, and the height of the side walls of the U-shaped channel being at least equal to the width between the side walls of the U-shaped channel so that a chamber is formed in which the end surface opposite the base portion of the U-shaped channel is substantially free of the field of electromagnetic waves guided in the double line, wherein for the construction as directional coupler there is provided a straight strip-like line which runs in a corresponding chamber of a block-shaped housing and wherein a second strip-like line is formed at an angle to the straight strip-like line in a correspondingly bent chamber of the block-shaped housing, such that the conductor paths approach one another over a zone corresponding to the required coupling factor, and wherein the chambers for the two conductor paths are connected with one another and are provided with rounded protuberances so large that the predominantly inductive coupling is compensated.

2. A microwave structure consisting of at least one double-line section in which one conductor is constructed in the form of a strip mounted on a strip of insulating material constructed as a printed circuit, the other conductor having a U-shaped channel and the strip-like conductor and strip of insulating material mounted in said channel, with the strip of insulating material arranged with its conductor-free side disposed against the bottom of the channel of said other conductor, the width of the strip-like conductor being about 0.4 of the distance between the parallel side walls of U-shaped channel, and the height of the side walls of the U-shaped channel being at least equal to the width between the side walls of the U-shaped channel so that a chamber is formed in which the end surface opposite the base portion of the U-shaped channel is substantially free of electromagnetic waves guided in the double line, wherein for the construction as an absorber an attenuation wedge is inserted below the strip-like conductor into the strip of insulating material which is tapered to provide a reflection-free transition.

3. A microwave structure according to claim 2, wherein on the side of the strip-like conductor remote from the strip of insulating material an additional attenuation wedge is disposed and the end zone of the wedge is covered by a conducting angle member which is in good conducting connection with the U-shaped conductor.

4. A microwave structure consisting of at least one double-line section in which one conductor is constructed in the form of a strip mounted on a strip of insulating material constructed as a printed circuit, the other conductor having a U-shaped channel and the strip-like conductor and strip of insulating material mounted in said channel, with the strip of insulating material arranged with its conductor-free side disposed against the bottom of the channel of said other conductor, the width of the strip-like conductor being about 0.4 of the distance between the parallel side walls of the U-shaped channel, and the height of the side walls of the U-shaped channel being at least equal to the width between the side walls of the U-shaped channel so that a chamber is formed in which the end surface opposite the base portion of the U-shaped channel is substantially free of the field of electromagnetic waves guided in the double line, wherein for the connection of two strip-like conductors disposed adjacent one another a T-shaped coil spring element is utilized whose vertical shank is disposed in the separating gap in the line conductor and, said coil spring being provided at the end thereof with barbs which are engageable behind the strip of insulating material, with the horizontal bar being arranged on the bottom of the strip-like conductor and in the bottom plate of the U-shaped conductor at the location of the coil spring element there is a recess sufficiently large to accommodate said barbs, and so dimensioned that the line disturbance caused by said spring element is simultaneously compensated.

5. A microwave component consisting of a double line section with one line constructed in the form of a strip of negligible thickness mounted on a strip of insulating material and constructed in the manner of a printed circuit, the other conductor comprising a U-shaped channel and has mounted within its side walls the one conductor mounted on the strip of insulating material whereby the strip of insulating material carrying the strip-like conductor is mounted within the U-shaped channel with its conductor-free side against the base portion of the U-shaped channel, and the width of the strip-like conductor being about 0.4 of the distance between the parallel side walls of the U-shaped channel, the thickness of the insulating material being about $\frac{1}{4.6}$ of the distance between the parallel walls of the U-shaped channel, the height of the side walls of the U-shaped channel being at least as great as the distance between the side walls of the U-shaped channel so that a chamber is formed in which the end surface opposite the base portion of the U-shaped channel is substantially free of the field of electromagnetic waves carried on the double line.

6. A microwave structure according to claim 5, wherein narrow elongated chambers are created within a preferable flat block-shaped housing by conductive subdividing walls, and that in said chambers the strips of insulating material are arranged with the strip-like conductors.

7. A microwave structure according to claim 5, wherein there are provided transitions of double line sections on coaxial line terminals, such that the outer conductors of the coaxial lines are conductively anchored in the wall of the U-shaped conductor, and the inner conductor of the individual coaxial line terminals are directly connected to the respective strip-like conductor.

8. A microwave structure according to claim 7, wherein in the transition zone from the strip-like conductor to the inner conductor of the individual coaxial line terminal means, are provided to reduce reflections which comprise indentations of the outer conductor.

9. A microwave structure according to claim 5, wherein in a coaxial line terminal extending perpendicularly to the strip-like conductor the outer conductor of the coaxial line terminal is secured to the bottom of the U-shaped conductor and extends perpendicularly, and wherein the inner conductor of the coaxial line terminal is extended through the strip of insulating material and connected to the strip-like conductor.

References Cited

UNITED STATES PATENTS

| | | | |
|---|---|---|---|
| 2,575,571 | 11/1951 | Wheeler | 333—10 |
| 2,721,312 | 10/1955 | Grieg et al. | 333—96 XR |
| 2,934,719 | 4/1960 | Kyhl | 333—10 |
| 3,162,717 | 12/1964 | Lentz. | |
| 3,166,723 | 1/1965 | Bock et al. | 333—98 XR |
| 3,221,274 | 11/1965 | Vaz | 333—10 |
| 3,315,182 | 4/1967 | Woolley | 333—10 |
| 3,012,210 | 12/1961 | Nigg | 333—10 |

FOREIGN PATENTS

| | | |
|---|---|---|
| 1,056,210 | 4/1959 | Germany. |

OTHER REFERENCES

"Microwave Engineering," Harvey Academic Press, London and New York, 1963, pp. 412–414 relied upon.

"Experimental Determination of the Properties of Microstrip Components," Arditi, Electrical Communication, December 1953, vol. 30, No. 4, p. 285.

HERMAN KARL SAALBACH, Primary Examiner

M. NUSSBAUM, Assistant Examiner

U.S. Cl. X.R.

333—84, 95, 96